C. L. PFLEIDERER.
MEANS FOR CERTIFYING CHECKS OR OTHER INSTRUMENTS.
APPLICATION FILED JUNE 7, 1911.

1,112,654. Patented Oct. 6, 1914.

Witnesses
Thro. Rosemann
R. H. Krenkel

Inventor
Charles L. Pfleiderer
By Joshua R. H. Potts
Attorney

UNITED STATES PATENT OFFICE.

CHARLES L. PFLEIDERER, OF PHILADELPHIA, PENNSYLVANIA.

MEANS FOR CERTIFYING CHECKS OR OTHER INSTRUMENTS.

1,112,654.   Specification of Letters Patent.   Patented Oct. 6, 1914.

Application filed June 7, 1911. Serial No. 631,705.

*To all whom it may concern:*

Be it known that I, CHARLES L. PFLEIDERER, a citizen of the United States, residing at Philadelphia, in the county of Philadelphia and State of Pennsylvania, have invented certain new and useful Improvements in Means for Certifying Checks or other Instruments, of which the following is a specification.

My invention relates to improvements in means for certifying checks or other instruments, the object of the invention being to provide an improved method of banking, whereby upon deposit of an amount in the bank, the bank issues to the depositor stamps to the value of the amount deposited, and said depositor when drawing a check, places on the back of the check stamps to the value of the face of the check.

A further object is to provide improved stamps which are of various face value, issued in accordance with deposits made in the bank, and which bear the depositor's number, whereby the stamps on the back of the check must not only be equal to, or in excess of, the face value of the check, but must each of them bear the depositor's number.

With these and other objects in view, the invention consists in certain novel features of construction and combinations and arrangements of parts, as will be more fully hereinafter described and pointed out in the claim.

Figure 1:
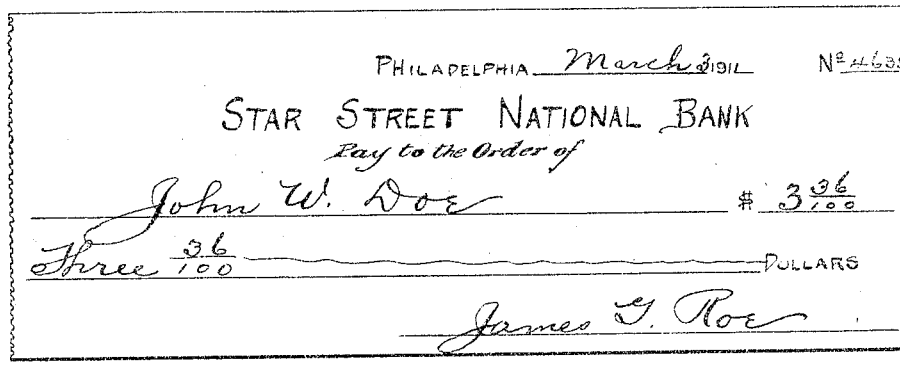
Figure 2:
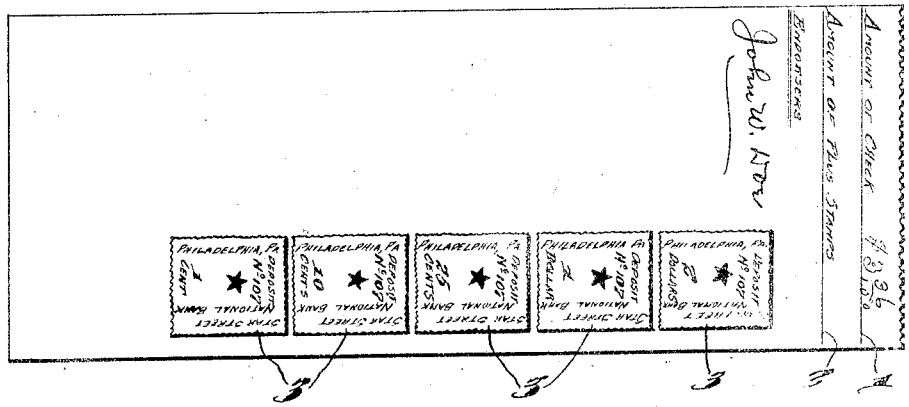

In the accompanying drawings—Figure 1, is a face view of a check, and Fig. 2, is a view of the back of the same check.

The face of the check as shown in Fig. 1, may be printed as any ordinary check is printed, but the back of the check contains at one end two lines 1 and 2, the former under the caption "Amount of check" and the latter under the caption "Amount of plus stamps." Below these lines appear the word "Indorsers." Along the back of the check, stamps 3 are pasted, and the payee and other indorsers should indorse the check on the back, as is customary, below the word "Indorsers." The stamps 3 are adapted to be issued by the bank, and when the depositor deposits a certain amount of money in the bank, the bank issues to him stamps to the value of the money deposited. Each of these stamps contains printed matter indicating the bank issuing the stamp, the value of the stamp, and the depositor's number.

The particular check illustrated is drawn for three dollars and thirty-six cents, and the stamps 3 on the back of the check show three dollars and thirty-six cents, which indicates to the payee that the drawer of the check has this amount on deposit, and is in effect a certified check. Should, for example, the depositor not be able to make the exact amount by adding together the stamps, he places stamps on the back of the check which are of an accumulated value in excess of the face value of the check. He then, on the back of the check, beside the words "Amount of plus stamps" inserts numerals indicating the amount the combined stamps equal in value in excess of the face value of the check. The bookkeeper in the bank therefore notes the fact, and issues to him stamp value to balance the account.

One essential feature of this case is the fact that each stamp contains the depositor's number, so that he cannot obtain other depositors' stamps, but must have his own. The check therefore not only serves to certify to the payee that the amount is in the bank, but it is also a safeguard to the drawer, to prevent him from overdrawing his account.

Various slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

A check, and stamps issued by the bank on which the check is drawn as certificates of deposit in said bank, said stamps pasted on the back of the check and all of the stamps of a depositor bearing the same number, and the several stamps of an accumulated value equal to the face value of the check, substantially as described.

In testimony whereof I have signed my name to this specification in the presence of two subscribing witnesses.

CHARLES L. PFLEIDERER.

Witnesses:
CHARLES E. POTTS,
R. H. KRENKEL.